US007527031B2

(12) United States Patent
Stauder

(10) Patent No.: US 7,527,031 B2
(45) Date of Patent: May 5, 2009

(54) METHOD FOR JOINTLY FITTING OR REMOVING A PISTON AND A CYLINDER LINER

(75) Inventor: Kurt Stauder, Jenbach (AT)

(73) Assignee: GE Jenbacher GmbH & Co OHG, Achenseestrasse (AT)

( * ) Notice: Subject to any disclaimer, the term of this patent is extended or adjusted under 35 U.S.C. 154(b) by 0 days.

(21) Appl. No.: 11/643,779

(22) Filed: Dec. 22, 2006

(65) Prior Publication Data

US 2007/0143998 A1 Jun. 28, 2007

(30) Foreign Application Priority Data

Dec. 23, 2005 (AT) .............................. A 2069/2005

(51) Int. Cl.
*F02B 75/32* (2006.01)
(52) U.S. Cl. .................................. 123/197.1; 123/197.3
(58) Field of Classification Search .............. 123/41.84, 123/193.2, 197.3
See application file for complete search history.

(56) References Cited

U.S. PATENT DOCUMENTS 4,594,760 A 6/1986 Dillard 5,056,470 A 10/1991 Wolters et al.

FOREIGN PATENT DOCUMENTS

| DE | 38 03 890 | 9/1988 |
| DE | 3803890 C1 | 9/1988 |
| DE | 196 36 089 | 3/1997 |
| GB | 503261 | 4/1939 |
| GB | 1 224 706 | 5/1969 |
| GB | 1 224 706 | 3/1971 |
| GB | 2 021 236 | 11/1979 |

OTHER PUBLICATIONS

Austrian Search Report issued Sep. 27, 2005 in the corresponding Austrian patent application.

*Primary Examiner*—Noah Kamen
(74) *Attorney, Agent, or Firm*—Wenderoth, Lind & Ponack, L.L.P.

(57) ABSTRACT

A method of jointly fitting or removing a piston and a cylinder liner in or from an engine block of an internal combustion engine is provided. During the fitting or removal operation, the cylinder liner is supported or held on a contact shoulder which is arranged at a connecting rod of the piston or at the piston.

20 Claims, 6 Drawing Sheets

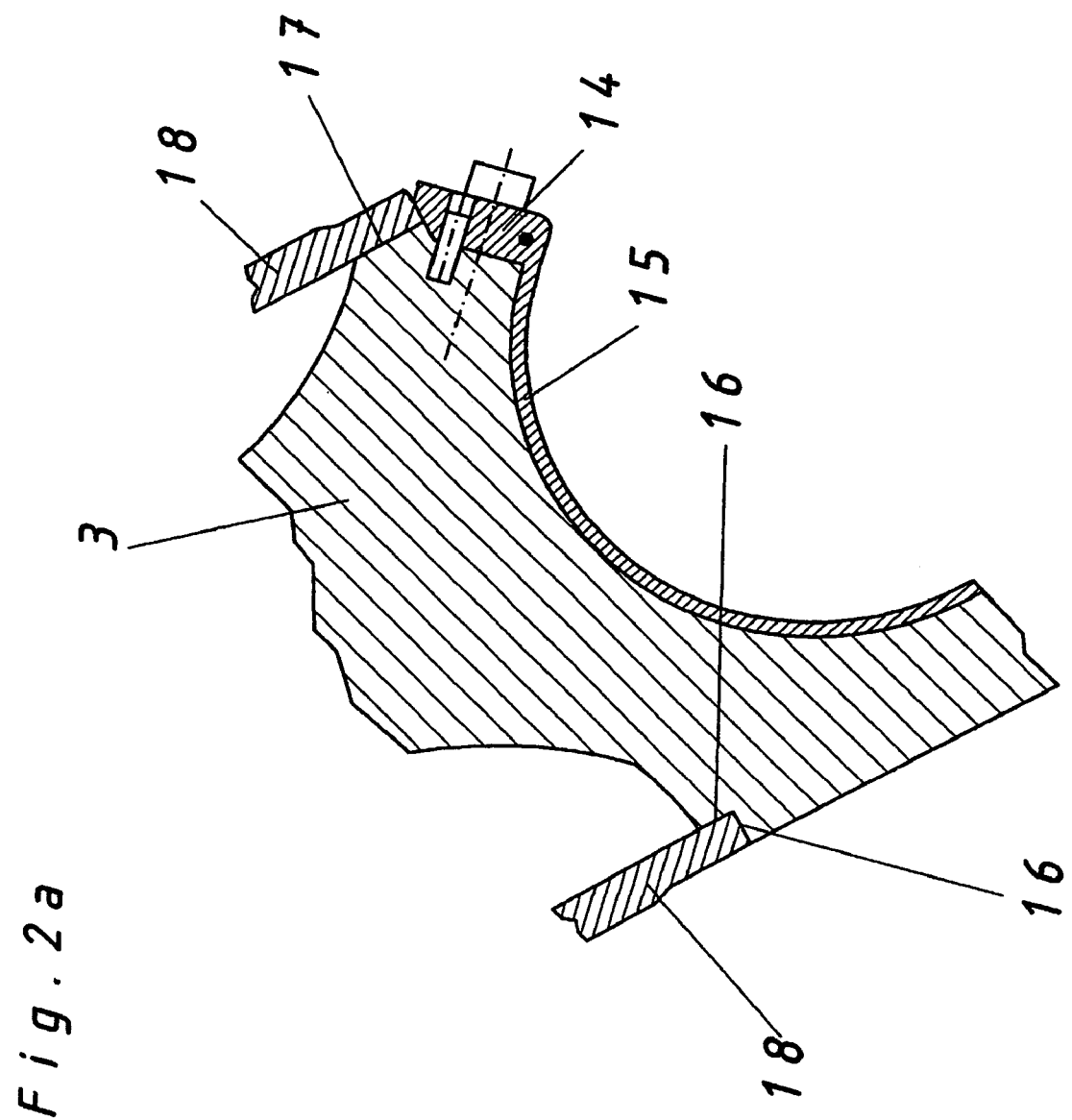

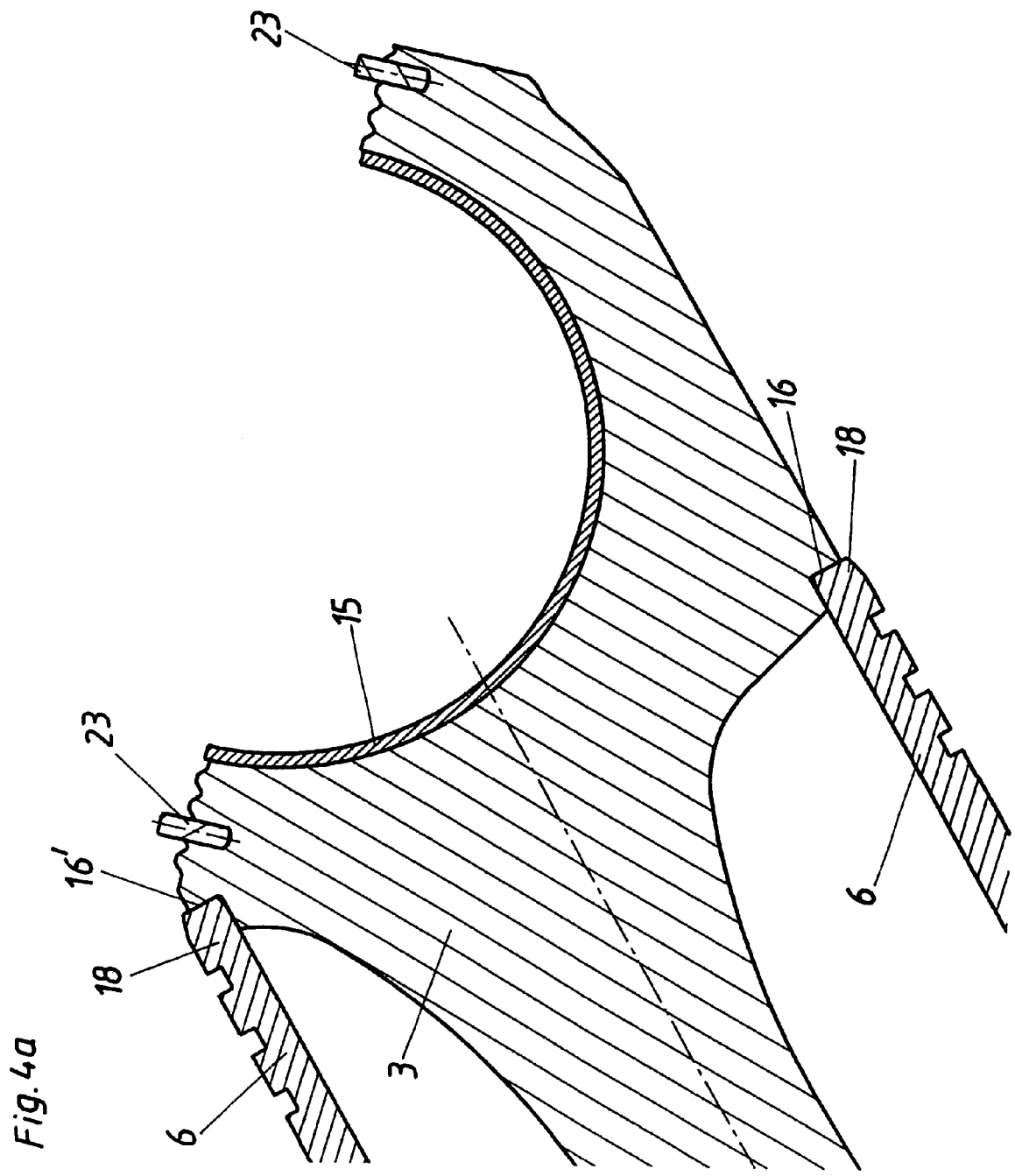

METHOD FOR JOINTLY FITTING OR REMOVING A PISTON AND A CYLINDER LINER

BACKGROUND OF THE INVENTION

The present invention concerns a method of jointly fitting and/or removing a piston and a cylinder liner in and/or from an engine block of an internal combustion engine. The invention also concerns an arrangement having a cylinder liner and a piston which can be arranged therein and optionally a connecting rod arranged on the piston as well as the piston, the connecting rod and the cylinder liner itself, and also an internal combustion engine and a gripping device.

Particularly in the case of large engines such as, for example, stationary gas engines the problem arises that, for strength reasons, the connecting rod eye which embraces the crankshaft of the internal combustion engine must be so large that the connecting rod can no longer be guided through the cylinder liner when fitting and/or removing the piston. For that situation, it is already known in the state of the art for the piston, connecting rod, and cylinder to be jointly fitted and/or removed. Thus it has already been proposed that gripping devices are to be used, which are fixed both to the piston and also to the cylinder liner. That however suffers from the disadvantage that additional screwthreads, eyes, hooks or the like have to be provided on the piston and the cylinder liner. Alternatively it is also known for spreading bodies to be spread in the cylinder liner and hold the piston under a reduced pressure. That procedure however suffers from the disadvantage that leaks mean that there is always the danger that the piston is not sufficiently securely held in the fitting and/or removal operation. Furthermore, fixing of the cylinder liner, which is based purely on friction, is also suitable rather only for lighter arrangements of cylinder liner and piston.

SUMMARY OF THE INVENTION

The object of the invention is to provide a method of the general kind set forth, in which the stated problems are avoided.

In accordance with the invention, the object is achieved in that during the fitting and/or removal operation, the cylinder liner is supported or held on a contact shoulder (flange) arranged at a connecting rod of the piston and/or at the piston and preferably integrally formed thereon.

A basic idea of the invention is therefore that the cylinder liner is to be supported during the fitting and/or removal operation on a contact shoulder which can be disposed on the connecting rod of the piston and/or on the connecting rod, whereby the cylinder liner is securely held. It is thus possible to prevent the cylinder liner from falling down.

In an advantageous variant, during the fitting and/or removal operation, the piston and the cylinder liner are jointly, preferably exclusively, held on the piston and/or pushed into the engine block and/or pulled out of the engine block. When smaller cylinder liners and pistons are involved, it is possible in that respect to grip and hold the piston by hand. Particularly with larger and heavier assemblies, however, it is generally appropriate to use a gripping device in order to hold the piston and also hang therefrom the connecting rod and cylinder liner. In all those variants, it is thus provided that the cylinder liner hangs from the connecting rod and/or piston and the entire assembly is gripped or held at the piston.

In accordance with a further aspect of the invention, there is also provided a gripping device for gripping around a piston having such an arrangement, which can be used for the method according to the invention.

An arrangement comprising a cylinder liner and a piston which can be arranged therein, which is suitable for carrying out the method, provides that the piston and/or the connecting rod has (have) a preferably integrally arranged contact shoulder (flange) at which the cylinder liner can be supported or held during the fitting and/or removal operation. A further aspect of the invention also embraces pistons, connecting rods and cylinder liners which are suitable therefor as well as internal combustion engines which have such an arrangement. The internal combustion engines can be for example stationary gas engines.

BRIEF DESCRIPTION OF THE DRAWINGS

Further details and features of the invention will be apparent from the specific description hereinafter with reference to the drawings, in which:

FIG. 2a is a detail view from FIG. 2 in the region in which the cylinder liner is supported on the connecting rod in the fitting and/or removal operation, FIG. 4a is a detail view from FIG. 4 in the region in which the cylinder liner is supported on the connecting rod in the fitting and/or removal operation.

DETAILED DESCRIPTION OF THE INVENTION

Figure 1:
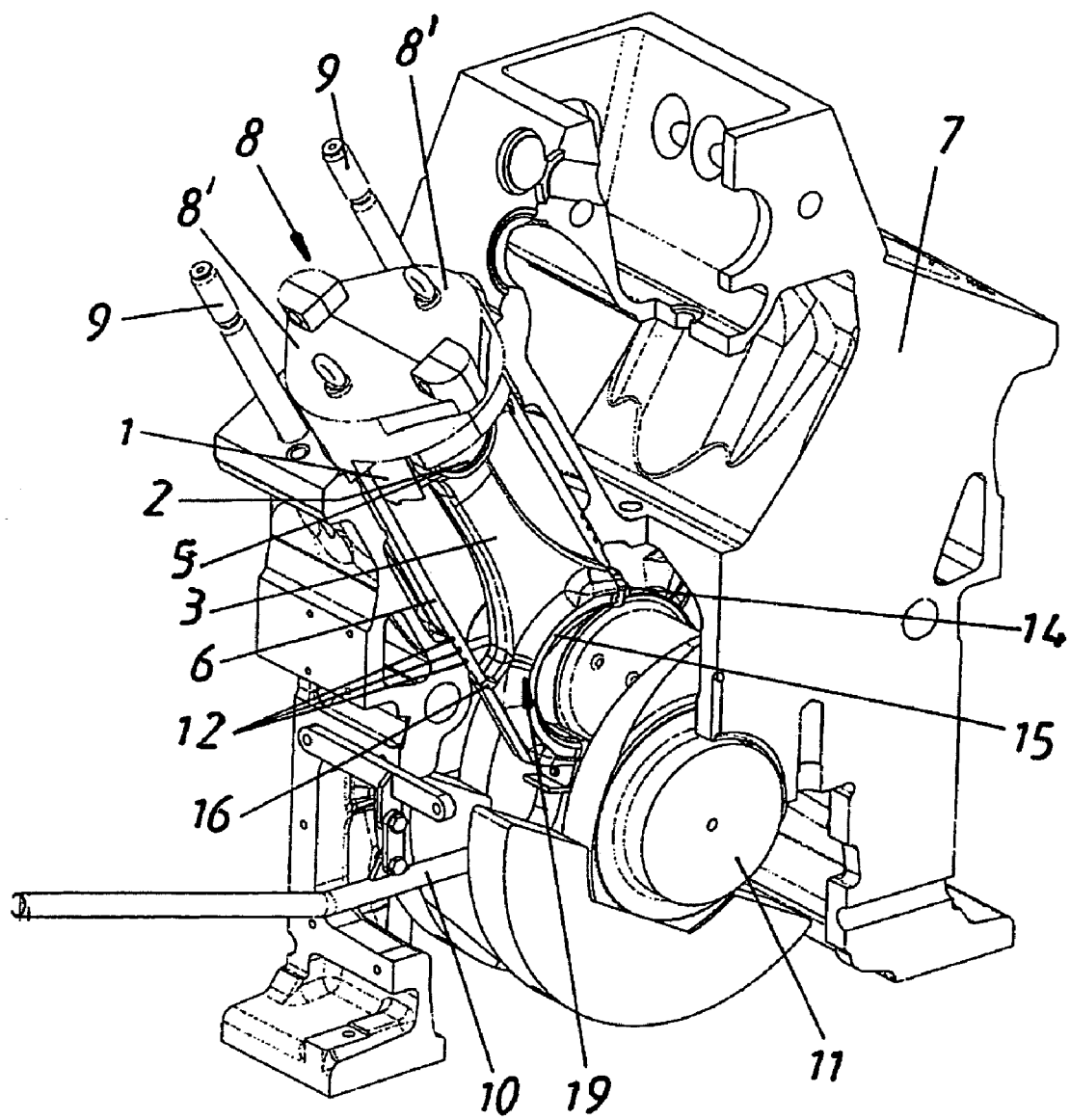
FIG. 1 is a perspective sectional view of an engine block with a first embodiment of an arrangement according to the invention comprising a cylinder liner, a piston and a connecting rod.
Figure 2:
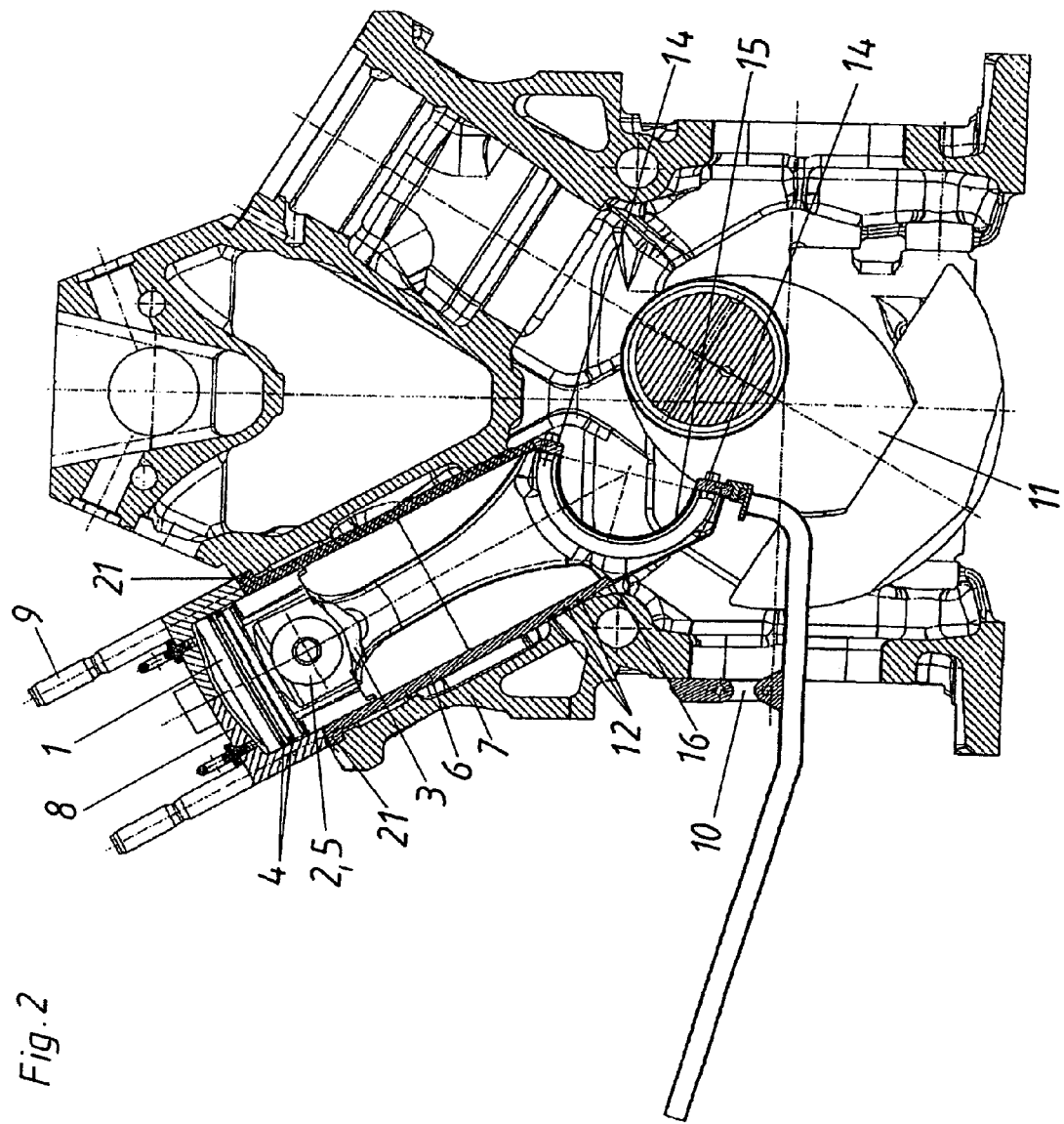
FIG. 2 is a corresponding vertical and flat section view.
Figure 3:
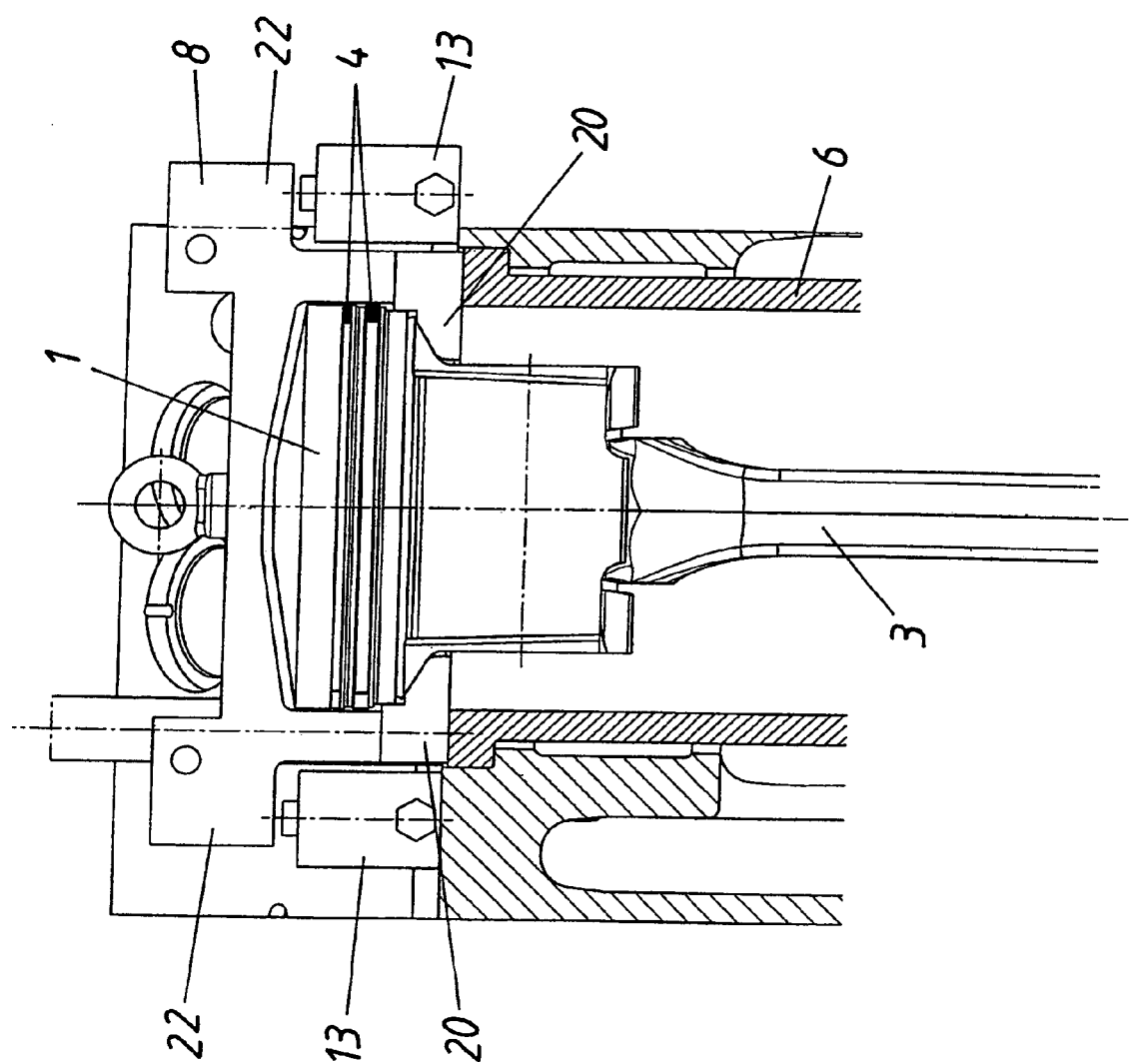
FIG. 3 is a detail section view of the region of the piston and the gripping device.
Figure 4:
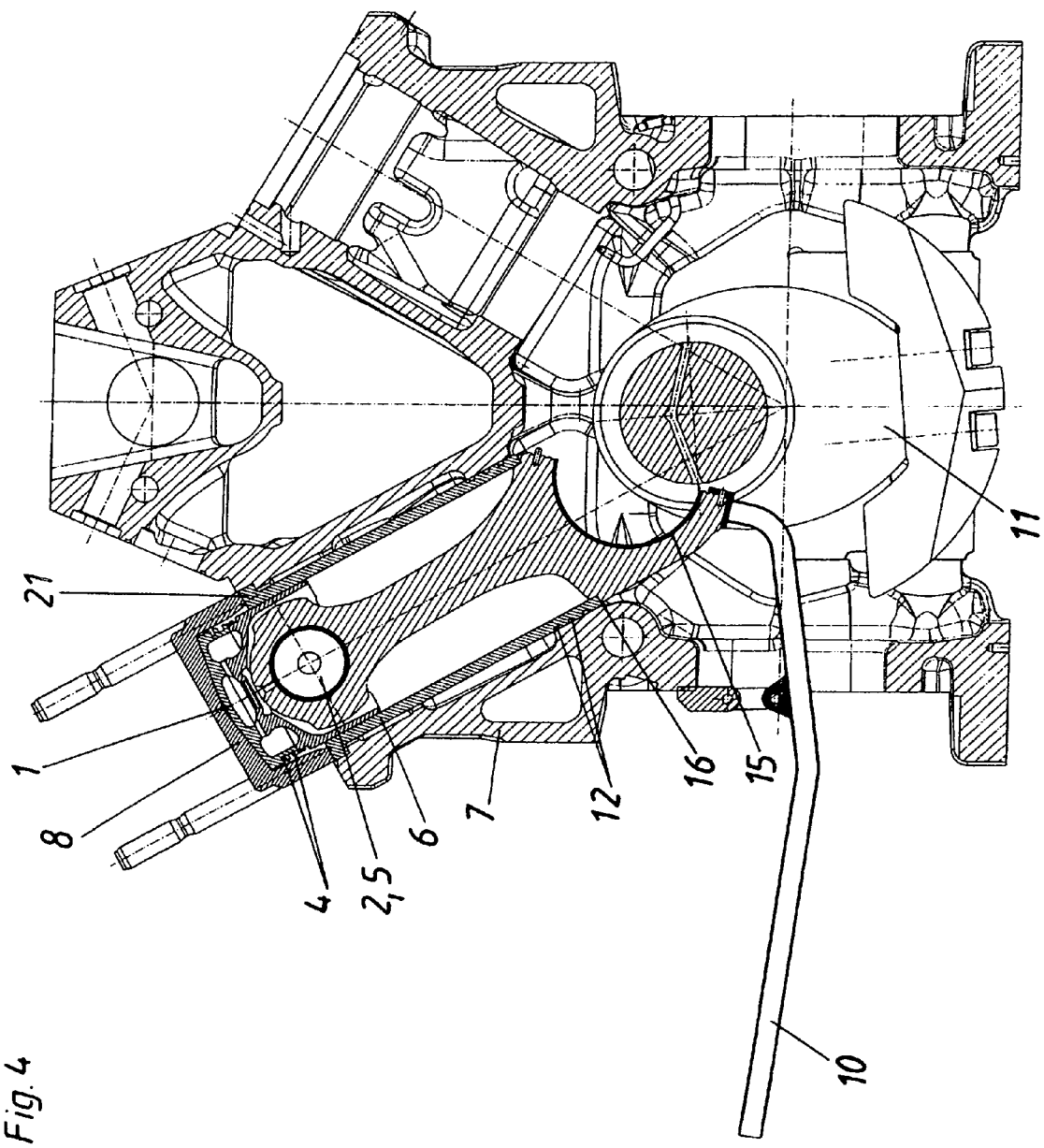
FIG. 4 is a vertical flat section view through a second embodiment according to the invention.

FIGS. 1, 2 and 4 show the condition in which the connecting rod yoke (no longer shown here) is released from the connecting rod 3 and the connecting rod eye 19 has been lifted off the crankshaft 11. In the illustrated view, the connecting rod 3 has been pushed upwardly on the cylinder head side out of the cylinder liner 6 by means of the mounting bar assembly 10 to such an extent that the two half-shells 8' of the gripping device 8 can be fitted on to and grip around the piston 1. In order to avoid additional adaptations in respect of the piston to the nature of the gripping device, an advantageous variant provides that the gripping device 8 has at least one projection for engaging into a groove 4 on the piston 1. After removal of the piston rings, the gripping device 8 can engage directly into the piston ring grooves 4 in which the piston rings are otherwise disposed. Alternatively, the gripping device, can also engage behind the piston 8 by means of preferably inclined gripping surfaces 20, as shown in FIG. 3.

In the position shown in FIGS. 1, 2 and 4 the cylinder liner 6 is supported at the contact shoulder (flange) 16 (FIGS. 1 and 2) or at the contact shoulders (flange) 16 and 16' (FIG. 4) of the connecting rod 3. The embodiment shown in FIGS. 1 and 2 additionally has on the connecting rod 3, in opposite relationship to the contact shoulder 16, a further (secondary) support surface 17 which serves to center the connecting rod 3 in the cylinder liner 6 as soon as the connecting rod 3 is pushed into the position shown in FIGS. 1 and 2 by the bar assembly 10 which is only present in the assembly operation. The term "centering" in this context is used essentially to denote a fit in accurate register relationship, which prevents the cylinder liner 6 from being able to slip down off the contact shoulder 16 when pulling on the piston 1. In the embodiment shown in FIGS. 4 and 4*a*, the centering effect is afforded by the cooperation of the two contact shoulders (flanges) 16 and 16'. The connecting rod 3 has its maximum diameter in the region of the connecting rod eye 19. In other words, the maximum diameter of the connecting rod 3 is at its end region which in the operative position is towards the crankshaft 11, and its maximum diameter is larger than the inside diameter of the cylinder liner 6. The contact shoulder 16 and the support surface 17 as shown in FIGS. 1 and 2 or the contact shoulders 16 and 16' as shown in FIGS. 4 and 4*a* are arranged in the illustrated embodiment in that end region and are formed integrally on the connecting rod 3. The contact shoulder 16 or the contact shoulders 16, 16' as illustrated engages or engage the lower edge 18 of the cylinder liner 6, which in the installation position faces towards the crankshaft 11.

The operation of fitting the piston 1, the connecting rod 3 and the cylinder liner 6 by means of a fitting method of a nature in accordance with the invention will now be briefly described hereinafter. Firstly the piston 1, the gudgeon pin 2 of the piston and the connecting rod 3 are assembled. The gudgeon pin 2 is secured with the gudgeon pin securing rings 5. That unit which is pre-assembled in that fashion is now introduced into the cylinder liner 6 from below (that is to say on the side of the lower edge 18 of the cylinder liner 6). Thereafter the unit consisting of the piston 1 and the connecting rod 3 is pushed upwardly in the cylinder liner 6 to such an extent that the connecting rod 3 is centered in the cylinder liner 6 by means of the contact shoulder 16 and the further support surface 17 or by means of the contact shoulders 16, 16'. The cylinder liner 6 now rests on the contact shoulder 16 or the contact shoulders 16, 16'. The piston rings are now fitted on to the piston 1, and the gripping device 8 must also be fitted thereon. In that case, for example, the two half-shell portions 8' can be fitted on to the piston 1 in such a way that the inclined gripping surfaces 20 engage behind the piston 1, as shown in FIG. 3.

The connecting rod bearing shell 15 is now secured to the open connecting rod eye 19 to prevent the shell 15 from rotating with respect to the connecting rod 3, and the shell 15 is fixed with the fixing lugs 14 shown in FIGS. 2 and 2*a*. In the second embodiment shown in FIGS. 4 and 4*a*, the fixing lugs 14 are admittedly not explicitly shown but they can also be shaped similarly as in the first embodiment. The sealing rings 12 are now fitted externally into the corresponding grooves in the cylinder liner 6. The unit which is pre-assembled in that way and consisting of the piston, the connecting rod, the cylinder liner and the gripping device is now introduced from above (on the cylinder head side) into the engine block or the crank case 7 after the seating surface in the crank case 7 has been previously provided with a suitable sealing agent which is known in the state of the art. The entire unit is then driven downwardly into the engine block 7—for example by means of a plastic hammer—until the annular flange 21 on the cylinder liner 6 bears against the corresponding seat on the crank case 7. That position is to be seen in FIGS. 1, 2 and 4. The mounting bar assembly 10 is now mounted laterally to the crank case 7 and adjusted or fixed at the fixing lugs 14, whereby the connecting rod 3 is fixed to the mounting bar assembly 10. In the second embodiment as shown in FIGS. 4 and 4*a* the mounting bar assembly 10 does not engage a fixing lug 14, but instead engages a centering pin 23 on the connecting rod 3. When that has been done, the gripping device 8 can be removed and a piston insertion sleeve (which is not shown here but which is known in the state of the art) can be centered at the upper cylinder liner fitting entry. After the piston 1 has been released from the gripping device 8, the connecting rod 3 together with the piston 1 can be moved downwardly by means of the mounting bar assembly 10 and the open connecting rod eye 19 can be fitted on to the crankshaft 11. Then the connecting rod yoke (which is not shown here but which is known in the state of the art), with the connecting rod bearing shell fitted therein, can be screwed to the connecting rod 3 with its initial tightening torque. After removal of the piston insertion sleeve which is not shown here further operation is effected as is known in the state of the art with a device for clamping down the cylinder liner 6. That clamping-down device can then be removed after hardening of the sealing agent and after a sealing integrity check. The further steps for fitting the cylinder head at the cylinder head bolts 9 are known in the state of the art.

In the removal operation, the procedure involved in accordance with the invention can be as follows: firstly the connecting rod yoke which is not shown in the drawings, with the bearing shell 15, is unscrewed from the connecting rod eye 19 and removed. The fixing lugs 14 are screwed to the connecting rod 3 in the first embodiment of FIGS. 1 and 2. Thereafter, the mounting bar assembly 10 is mounted to the crank case 7 and adjustment or fixing of the mounting bar assembly 10 to the lower fixing lug 14 is effected, whereby the connecting rod 3 is fixed or secured to the bar assembly 10. In the second embodiment, the mounting bar assembly 10 does not engage the fixing lug 14, but instead engages the centering pin 23. Now, the unit consisting of the connecting rod 3 and the piston 1 is pushed upwardly by means of the mounting bar assembly 10, that is to say away from the crankshaft 11, to such an extent that the connecting rod 3 is centered in the cylinder liner 6 by means of the further support surface 17 or the two contact shoulders 16, 16', whereby then the cylinder liner 6 automatically bears against the contact shoulder 16 or the contact shoulders 16, 16' of the connecting rod 3. In that upward displacement, the piston 1 is pushed upwardly out of the cylinder liner 6 to such an extent that the piston rings in the piston ring grooves 4 snap out of the cylinder liner 6 whereby the piston 1 and the connecting rod 3 are prevented from sliding back. The gripping device 8 is then fitted. In that respect, in a first variant, the two gripping surfaces 20 can engage behind the piston 1 as shown in FIG. 3. Alternatively, the sealing rings are first removed from the piston ring grooves 4 so that the piston ring grooves 4 can be engaged by means of suitable projections on the gripping device 8. In both variants at any event after conclusion of the mounting operation the gripping device 8, the piston 1, the connecting rod 3 and the cylinder liner are fixed. Subsequently to the above-depicted steps, the cylinder liner 6 now has to be released from the crank case 7. For that purpose it may be sufficient for the connecting rod 3 and the cylinder liner 6 supported thereon to be further pushed upwardly out of the crank case 7 by means of the mounting bar assembly 10. Frequently, however, in particular after operation over a prolonged period of time, it happens that the cylinder liner 6 is very firmly seated in the crank case 7. If that is the case, the unit consisting of the gripping device 8, the piston 1, the connecting rod 3 and the cylinder liner 6 can be pressed upwardly by some millimeters by means of the hydraulic cylinders 13 shown in FIG. 3 so that the connection between the cylinder liner 6 and the crank case 7 is released. As shown in FIG. 3 it is advantageous if the hydraulic cylinders 13 are supported against the crank case 7 and press against corresponding projections 22 on the gripping device 8. After release of the cylinder liner 6, the entire unit, hanging from the gripping device 8, can be lifted out of the crank case 7 by hand or, when dealing with larger units, by means of a crane. In the release operation as also in the operation of lifting the unit out, the cylinder liner 6 can be supported according to the invention on the connecting rod 3, while the gripping device 8 engages the piston 1. The further steps in the removal procedure are performed in the reverse sequence to the fitting procedure and therefore do not have to be set forth separately once again here.

The invention claimed is:

1. A piston-cylinder arrangement comprising:
   a cylinder liner;
   a piston to be arranged in said cylinder liner; and
   a connecting rod attached to said piston and having a contact shoulder thereon, said contact shoulder being shaped as a recess for abutting against and engaging a corresponding portion of said cylinder liner so as to properly position and hold said piston and said connecting rod relative to said cylinder liner.

2. The arrangement of claim 1, wherein said contact shoulder is integrally formed on said connecting rod.

3. The arrangement of claim 2, wherein said contact shoulder is one of at least two contact shoulders of said connecting rod for each abutting against and engaging a corresponding portion of said cylinder liner.

4. The arrangement of claim 3, wherein each of said at least two contact shoulders is integrally formed on said connecting rod.

5. The arrangement of claim 1, wherein said connecting rod further has at least one secondary support surface for centering said piston and said connecting rod in said cylinder liner.

6. The arrangement of claim 5, wherein said at least one secondary support surface and said contact shoulder are arranged for centering said piston and said connecting rod in said cylinder liner.

7. The arrangement of claim 1, wherein said contact shoulder is arranged at an end region of said connecting rod to be connected to a crankshaft.

8. The arrangement of claim 1, wherein said connecting rod has a maximum diameter portion having a diameter larger than an inside diameter of said cylinder liner.

9. The arrangement of claim 1, wherein said contact shoulder is formed as a notch-shaped recess having a shape corresponding to a shape of an end of said cylinder liner for abutting against and engaging said end of said cylinder liner so as to properly position and hold said piston and said connecting rod relative to said cylinder liner.

10. The arrangement of claim 9, wherein said notch-shaped recess is formed at an end of said connecting rod to be connected to a crankshaft.

11. The arrangement of claim 1, further comprising a connecting rod bearing shell attached to an end of said connecting rod with a fixing lug.

12. The arrangement of claim 1, wherein said cylinder liner has a first end with an annular flange projecting radially outward so as to engage and be supported on a corresponding surface of an engine block, said first end of said cylinder liner being located opposite a second end having said corresponding portion for abutting against and engaging said contact shoulder of said connecting rod.

13. A connecting rod having a contact shoulder shaped as a recess for abutting against and engaging a corresponding portion of a cylinder liner during a fitting and removal operation of said cylinder liner into and from an engine block.

14. An internal combustion engine comprising:
    an engine clock;
    a cylinder liner to be fitted within said engine block;
    a piston to be arranged in said cylinder liner; and
    a connecting rod attached to said piston and having a contact shoulder thereon, said contact shoulder being shaped as a recess for abutting against and engaging a corresponding portion of said cylinder liner so as to properly position and hold said piston and said connecting rod relative to said cylinder liner.

15. The internal combustion engine of claim 14, wherein said contact shoulder is integrally formed on said connecting rod.

16. The internal combustion engine of claim 14, wherein said connecting rod further has at least one secondary support surface for centering said piston and said connecting rod in said cylinder liner.

17. The internal combustion engine of claim 14, wherein said contact shoulder is formed as a notch-shaped recess having a shape corresponding to a shape of an end of said cylinder liner for abutting against and engaging said end of said cylinder liner so as to properly position and hold said piston and said connecting rod relative to said cylinder liner.

18. The internal combustion engine of claim 14, wherein said cylinder liner has a first end with an annular flange projecting radially outward so as to engage and be supported on a corresponding surface of an engine block, said first end of said cylinder liner being located opposite a second end having said corresponding portion for abutting against and engaging said contact shoulder of said connecting rod.

19. A piston-cylinder arrangement comprising:
    a cylinder liner;
    a piston to be arranged in said cylinder liner; and
    a connecting rod attached to said piston, wherein said piston has a contact shoulder thereon, said contact shoulder being shaped as a recess for abutting against and engaging a corresponding portion of said cylinder liner so as to properly position and hold said piston and said connecting rod relative to said cylinder liner.

20. The arrangement of claim 19, wherein said contact shoulder is integrally formed on said piston.

\* \* \* \* \*